United States Patent
Li et al.

(10) Patent No.: US 10,469,218 B2
(45) Date of Patent: Nov. 5, 2019

(54) INTER-CELL INTERFERENCE MITIGATION FOR TRAFFIC ACCORDING TO PRIORITY

(71) Applicant: QUALCOMM Incorporated, San Diego, CA (US)

(72) Inventors: Chong Li, Jersey City, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 15/163,423

(22) Filed: May 24, 2016

(65) Prior Publication Data

US 2017/0346609 A1 Nov. 30, 2017

(51) Int. Cl.
*H04L 5/00* (2006.01)
*H04W 72/10* (2009.01)
*H04W 72/04* (2009.01)

(52) U.S. Cl.
CPC ........... *H04L 5/0032* (2013.01); *H04W 72/10* (2013.01); *H04W 72/0426* (2013.01); *Y02D 70/122* (2018.01); *Y02D 70/1242* (2018.01); *Y02D 70/1262* (2018.01); *Y02D 70/142* (2018.01); *Y02D 70/144* (2018.01); *Y02D 70/26* (2018.01)

(58) Field of Classification Search
CPC .................................................. H04L 5/0032
USPC ....................................................... 370/329
See application file for complete search history.

(56) References Cited

U.S. PATENT DOCUMENTS

| 8,711,721 | B2 | 4/2014 | Smith et al. | |
|---|---|---|---|---|
| 2009/0197538 | A1* | 8/2009 | Borran | H04W 52/243 455/63.1 |
| 2009/0268684 | A1* | 10/2009 | Lott | H04W 72/087 370/329 |
| 2012/0134267 | A1* | 5/2012 | Noriega | H04W 72/1236 370/230 |
| 2015/0126207 | A1 | 5/2015 | Li et al. | |
| 2015/0131537 | A1 | 5/2015 | Chiang et al. | |
| 2015/0146675 | A1* | 5/2015 | Zhang | H04L 41/082 370/329 |
| 2015/0181465 | A1 | 6/2015 | Dao et al. | |

(Continued)

OTHER PUBLICATIONS

International Search Report and Written Opinion—PCT/US2017/030018—ISA/EPO—dated Jul. 25, 2017.

*Primary Examiner* — Samina F Choudhry
(74) *Attorney, Agent, or Firm* — Arent Fox LLP

(57) ABSTRACT

Traffic in a first cell may experience interference from or may cause interference to traffic in an adjacent cell, which may lead to undesirable performance in one or both of the first cell and the adjacent cell. For example, a user equipment (UE) near an edge of the first cell may experience appreciable interference based on the reuse of resources. Accordingly, for transmissions in adjacent cells over a same band or sub-band, one UE may need to reduce transmit power in order to yield to another UE in an adjacent cells. An apparatus may be configured to determine first traffic associated with a first priority and second traffic associated with a second priority. The apparatus may be further configured to assign, based on the first priority and second priority, a first set of resources to the first traffic and a second set of resources to the second traffic.

28 Claims, 11 Drawing Sheets

(56) References Cited

U.S. PATENT DOCUMENTS

2015/0215016 A1    7/2015   Hunukumbure
2017/0245288 A1*   8/2017   Lindoff ............... H04W 72/082

* cited by examiner

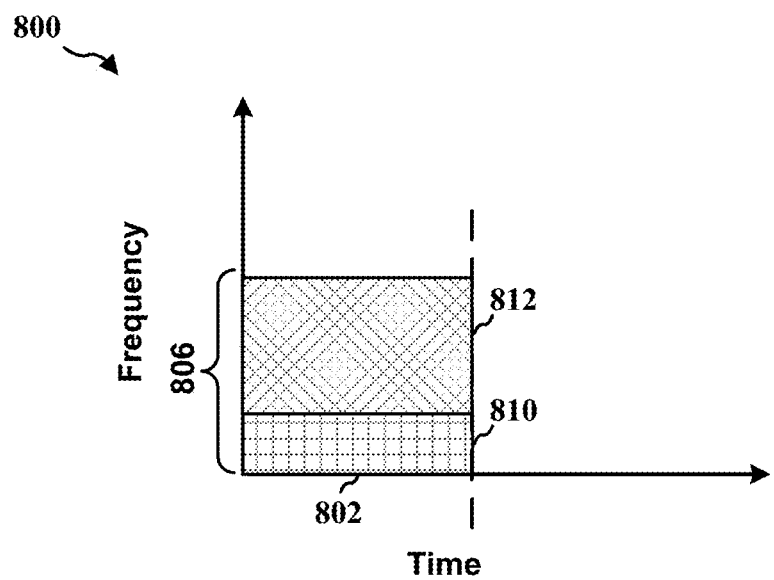
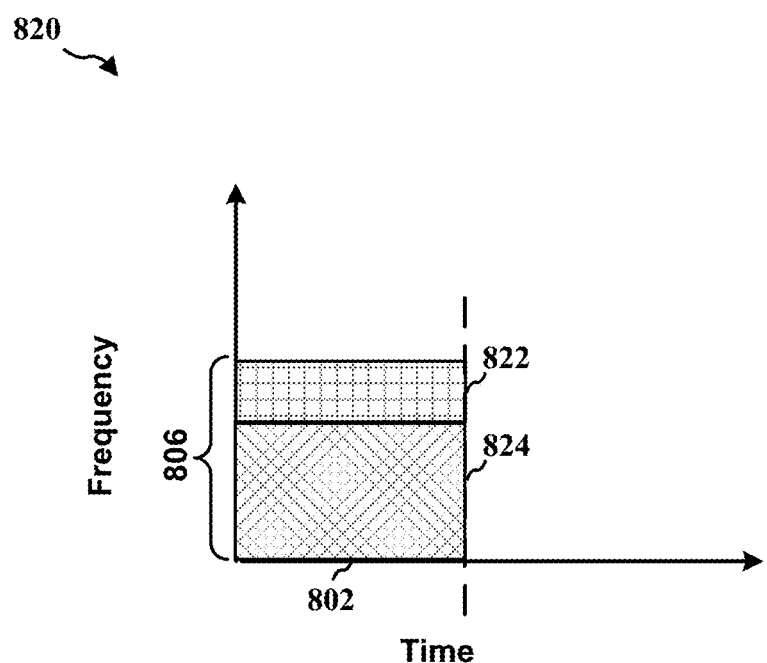
FIG. 8

INTER-CELL INTERFERENCE MITIGATION FOR TRAFFIC ACCORDING TO PRIORITY

BACKGROUND

Field

The present disclosure relates generally to communication systems, and more particularly, to a mitigation of inter-cell interference based on different traffic types having different priorities.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Traffic in a first cell may experience interference from or may cause interference to traffic in an adjacent cell, which may lead to undesirable performance in one or both of the first cell and the adjacent cell. For example, a user equipment (UE) near an edge of the first cell may experience appreciable interference based on the reuse of resources by an adjacent cell. Accordingly, for transmissions in adjacent cells over a same band or sub-band, a UE in a cell may need to reduce transmit power in order to yield to another UE in an adjacent cell.

In an aspect of the disclosure, a method, a computer-readable medium, and an apparatus are provided. The apparatus may be configured to determine, for a first cell, a first traffic associated with a first priority. The apparatus may be further configured to determine, for the first cell, a second traffic associated with a second priority. In an aspect, the second priority may be lower than the first priority. The apparatus may be further configured to assign, based on the first priority and second priority, a first set of resources to the first traffic and a second set of resources to the second traffic. The apparatus may be further configured to communicate, in the first cell, with a first device on the first set of resources. In an aspect, the first device may be associated with the first traffic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram of a traffic-based priority scheme.

DETAILED DESCRIPTION

Figure 1:
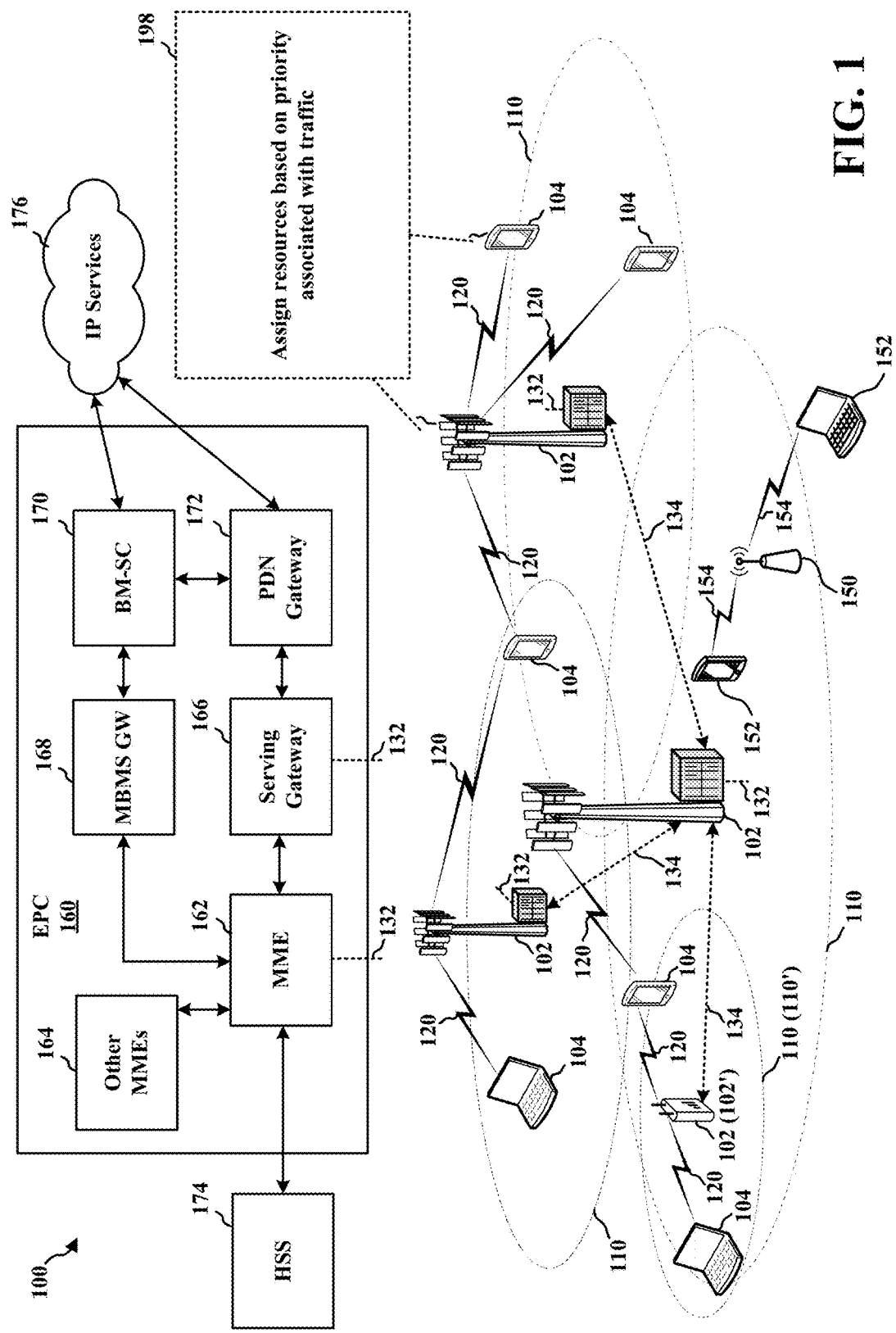
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to assign resources to a type of traffic (e.g., voice traffic, video traffic, high priority traffic) in a cell based on a priority associated with that type of traffic. For example, the eNB 102 may determine a first type of traffic associated with a first priority and second type of traffic associated with a second priority. In one aspect, the eNB 102 may determine that a device in a coverage area provided by the eNB 102 is configured to generate a first type of traffic, while another device in the coverage area is configured to generate a second type of traffic. For example, the eNB 102 may receive a signal from a device that indicates a type of traffic the device is configured to generate. The eNB 102 may determine a priority for a type of traffic, such as by assigning a priority to that traffic (e.g., MiCr traffic may be prioritized over other traffic). In an aspect, a device may be configured to generate multiple types of traffic (e.g., a device may generate both MiCr traffic and other traffic).

The eNB 102 may then assign a first set of resources to the first type of traffic and a second set of resources to the second type of traffic. In FIG. 1, the eNB 102 may transmit an indication of assigned resources 198 to one or more UEs 104 in a cell provided by the eNB 102. In an aspect, the indication may be scheduling information (e.g., sent on a physical downlink control channel).

Figure 2:
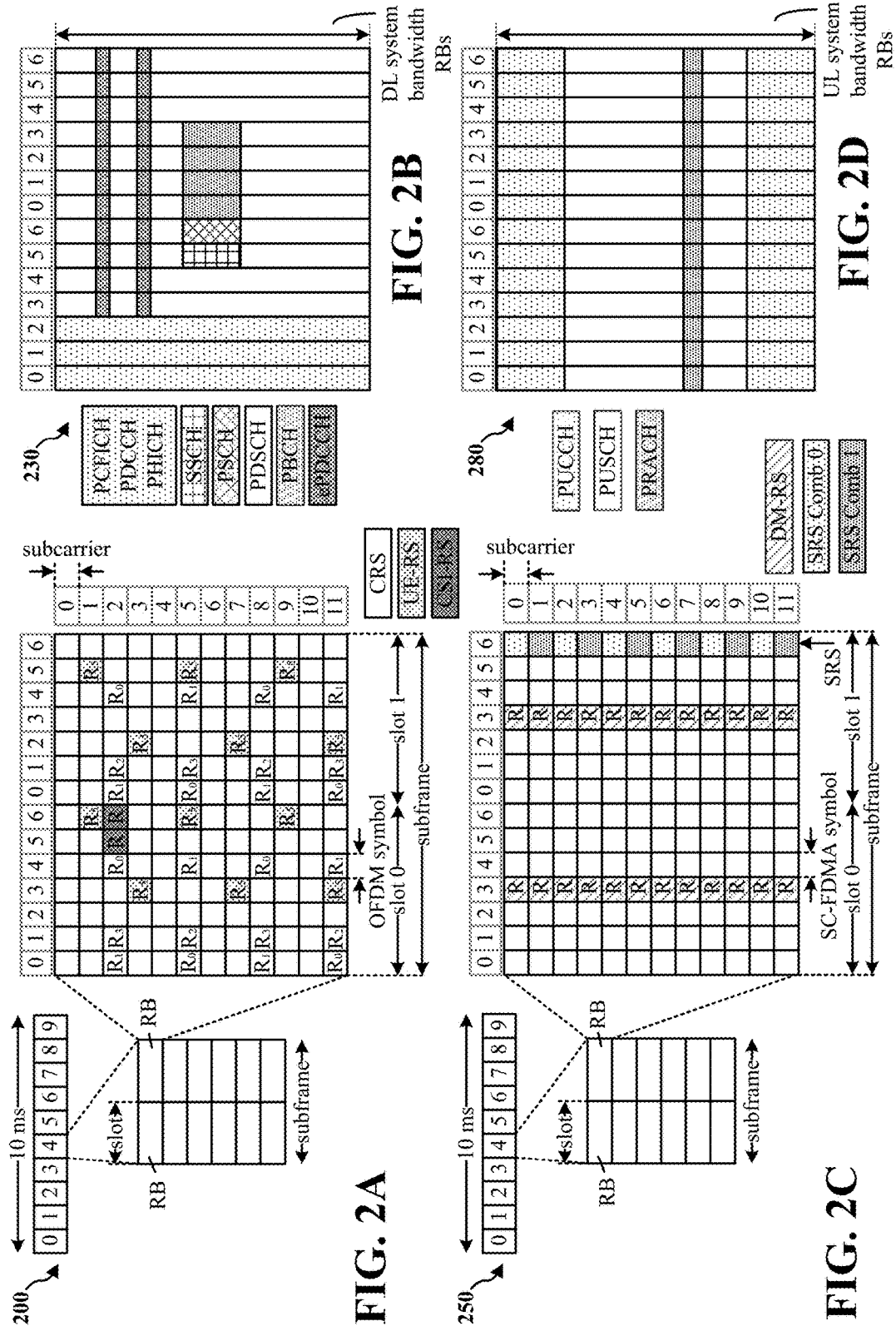
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
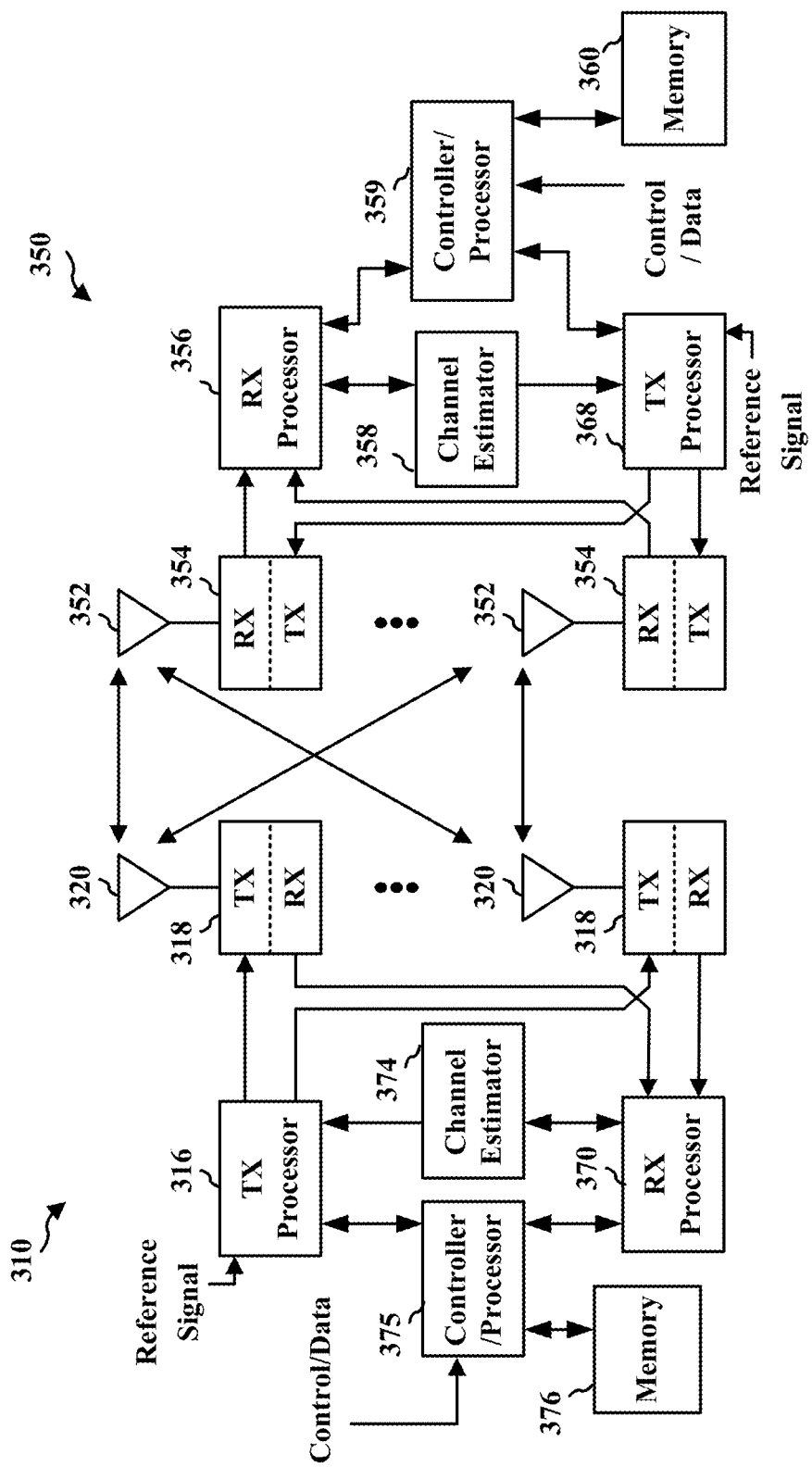
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
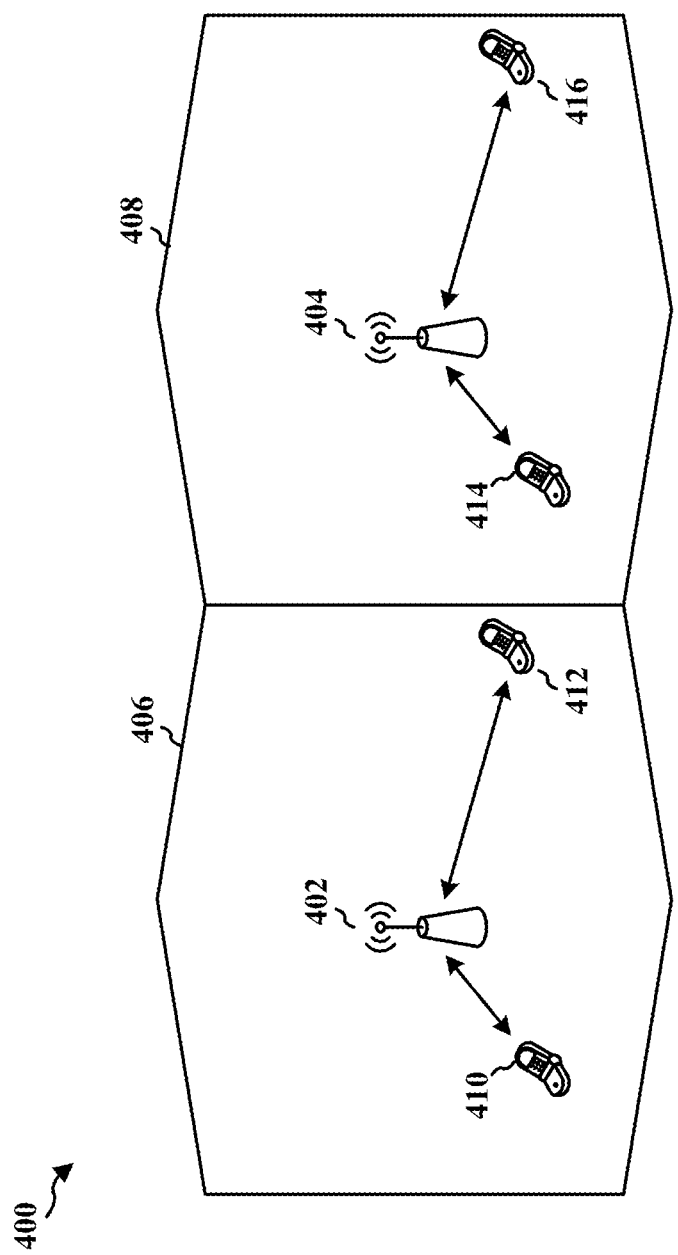
FIG. 4 is a diagram of a wireless communications system.

FIG. 4 is a diagram of a wireless communications system 400. The wireless communications system 400 includes a plurality of UEs 410, 412, 414, 416. The wireless communications system 400 further includes a plurality of base stations 402, 404 configured to provide respective cells 406, 408.

The traffic in a first cell 406 may experience interference from or may cause interference to traffic in an adjacent cell 408, which may lead to undesirable performance in one or both of the first cell 406 and the adjacent cell 408. For example, a UE 412 near an edge of the first cell 406 may experience appreciable interference based on the reuse of resources by the adjacent cell 408. Accordingly, for transmissions in the adjacent cell 408 over a same band or sub-band, another UE 414 may need to reduce transmit power in order to yield to the first UE 412.

Various wireless technologies may be based on wireless sensor network (WSN) approaches and may provide communication at increased reliability (e.g., bit error rate (BER) at 10e-9) and decreased latency (e.g., 2 milliseconds (ms)). Such wireless communication may be referred to as "mission critical" (MiCr) communication. MiCr communication may occur in both licensed and unlicensed frequency bands. MiCr communication in unlicensed frequency bands may offer low-cost access and reduced complexity. For example, wireless algorithms, systems, and applications (WASA) wireless solutions for factory automation may use a Bluetooth-based technology that uses a 2.4 gigahertz (GHz) Industrial, Scientific, and Medical (ISM) unlicensed band. However, MiCr communication on an unlicensed frequency band (e.g., factory automation and process control) may be vulnerable to interference. For example, channel access for MiCr communication may fail if the unlicensed channel is occupied by other devices (e.g., WiFi devices, Bluetooth devices, etc.) that use the same unlicensed frequency band. In another example, MiCr communication may fail to achieve a desired QoS due to external interference (e.g., microwave interference).

In an aspect, traffic associated with one or more UEs may be associated with different priorities. In an aspect, traffic in the cells 406, 408 may include traffic of a first type associated with a first priority, which may be prioritized over traffic of a second type associated with a second priority. For example, various wireless technologies may be based on wireless sensor network (WSN) approaches. This class of wireless technologies may require relatively high reliability (e.g., bit error rate (BER) at 10e-9) and relatively low latency (e.g., 2 milliseconds (ms)). Such wireless technologies may be referred to as "mission critical" (MiCr). However, various approaches to MiCr communication (e.g., factory automation and process control) may be vulnerable to interference (e.g., MiCr communication may be subject to relatively stringent quality of service (QoS) requirements).

In order to satisfy reliability and/or latency requirements commensurate with MiCr communication, MiCr traffic may be associated with a first priority that is higher than a second priority assigned to another type of traffic (e.g., voice traffic, video traffic). In an aspect, certain types of traffic (e.g., conventional data communication that is not considered MiCr, voice call, etc.) may be associated with the second priority that is lower than the first priority. In aspects, traffic associated with the second priority, lower than the first priority, may yield to traffic associated with the first priority (e.g., MiCr traffic) on a same sub-band, even if that traffic is in a neighboring cell.

In an aspect, the first base station 402 may be configured to determine first traffic for the first cell 406 that is associated with a first priority. For example, the first base station 402 may determine a first type of traffic associated with a first priority and second type of traffic associated with a second priority. In one aspect, the first base station 402 may determine that a device (e.g., the UE 412) in the cell 406 provided by the first base station 402 is configured to generate a first type of traffic, while another device (e.g., the UE 410) is configured to generate a second type of traffic. For example, the first base station 402 may receive a signal from the UE 412 that indicates a type of traffic the UE 412 is configured to generate. The first base station 402 may determine a priority for a type of traffic, such as by assigning a priority to that traffic (e.g., MiCr traffic may be prioritized over other traffic). In an aspect, a device may be configured to generate multiple types of traffic (e.g., a device may generate both MiCr traffic and other traffic).

The first base station 402 may then assign a first set of resources to the first type of traffic and a second set of resources to the second type of traffic. The first base station 402 may transmit an indication of assigned resources to the UEs 410, 412 in a cell provided by the first base station 402. In an aspect, the indication may be scheduling information (e.g., sent on a physical downlink control channel). For example, the first base station 402 may be configured to determine that an MiCr UE 412 is operating in the first cell 406 (e.g., the UE 412 may indicate to the first base station 402 that the UE 412 is configured to generate MiCr traffic). Accordingly, the first base station 402 may determine that MiCr traffic for the MiCr UE 412 should be prioritized over other traffic, such as traffic communicated by another UE 410 in the first cell. For example, the first base station 402 may determine that the generated by the other UE 410 is lower priority and should yield to the MiCr traffic for the MiCr UE 412 in the first cell 406.

To avoid interference and to allow traffic associated with multiple priorities to contemporaneously operate in the first cell 406, the first base station 402 may assign a first set of resources to traffic generated by the MiCr UE 412 and, similarly, may assign a second set of resources to traffic generated by the other UE 410. In an aspect, the first base station 402 may signal the assignment of resources to the UEs 410, 412 operating in the cell 406 provided by the first base station 402. For example, the first base station 402 may signal to the first UE 412 that the first UE 412 is to communicate first-priority traffic on a first set of resources. Similarly, the first base station 402 may signal to the second UE 410 that the second UE 410 is to communicate second-priority traffic on a second set of resources.

In an aspect, the first base station 402 may divide an available frequency band into a plurality of sub-bands. For example, the first base station 402 may divide a wideband spectrum into a plurality of sub-bands and may assign the MiCr traffic to a first sub-band and may assign the other traffic to a second sub-band. Thus, first-priority traffic (e.g., MiCr traffic) and second-priority traffic (e.g., normal traffic) may contemporaneously occur in the first cell 406, but the use of different sub-bands may mitigate interference between the first-priority traffic and the second-priority traffic.

In aspects, a similar approach may be followed in the adjacent cell 408. That is, the second base station 404 may be configured to determine first traffic for the second cell 408 that is associated with a first priority. For example, the second base station 404 may be configured to determine that an MiCr UE 416 is operating in the second cell 408. Accordingly, the second base station 404 may determine that traffic for the MiCr UE 416 should be prioritized over another UE 414.

To avoid interference and to allow traffic associated with multiple priorities to contemporaneously operate in the second cell 408, the second base station 404 may assign a first set of resources to traffic generated by the MiCr UE 416 and, similarly, may assign a second set of resources to traffic generated by the other UE 414.

In an aspect, the second base station 404 may divide an available frequency band into a plurality of sub-bands. That is, the second base station 404 may divide a wideband spectrum into a plurality of sub-bands and may assign the first-priority traffic to a first sub-band and may assign the second-priority traffic to a second sub-band. Thus, first-priority traffic and second-priority traffic may contemporaneously occur in the second cell 408, but the differing sub-bands may mitigate interference between the MiCr traffic and the other traffic.

The first and second cells 406, 408 may be adjacent and may share a same wideband spectrum for communication. Therefore, intercellular interference may occur, for example, when UEs are near a cell edge and/or adjacent to another cell. Therefore, the first and second base stations 402, 404 may perform one or more operations to mitigate inter-cell interference.

In an aspect, the first and second base stations 402, 404 may be configured to coordinate with each other when assigning frequency resources of the shared spectrum when assigning resources in the respective cells 406, 408. In an aspect, the first and second base stations 402, 404 may communicate over an X2 interface and/or over a backhaul link. Because first-priority traffic (e.g., MiCr traffic) may be prioritized over second-priority traffic, the first and second base stations 402, 404 may be configured to negotiate so that first-priority traffic in the first cell 406 is assigned different resources than first-priority traffic in the second cell 408. For example, a wideband spectrum may divided into a plurality of narrowband sub-bands. The first and second base stations 402, 404 may negotiate so that first-priority traffic in the first cell 406 is assigned a first narrowband sub-band, and second-priority traffic in the second cell 408 is assigned an overlapping narrowband sub-band. Similarly, the first and second base stations 402, 404 may negotiate so that first-priority traffic in the second cell 408 is assigned a second narrowband sub-band, and second-priority traffic in the first cell 406 is assigned an overlapping narrowband sub-band. Such an assignment may mitigate interference to first-priority traffic in the first and second cells 406, 408.

In an aspect, the first and second base station 402, 404 may negotiate so that resources assigned to first-priority traffic in the first cell 406 do not overlap with resources assigned to first-priority traffic in the second cell 408. In another aspect, the first and second base station 402, 404 may negotiate so that resources assigned to first-priority traffic in the first cell 406 partially overlap with resources assigned to first-priority traffic in the second cell 408, which may still mitigate interference.

In an aspect, the first and second base station 402, 404 may perform operations to prevent interference from devices in the respective cells 406, 408 to the neighboring cells 406, 408. For example, a first UE 412 in the first cell 406 may be associated with first-priority traffic. The first UE 412 may be near an edge of the first cell 406, which may cause the first UE 412 to be susceptible to interference from UEs operating in the neighboring cell 408. Another UE 414 associated with second-priority traffic may be near the cell edge of the second cell 408 and, therefore, may cause interference to the first UE 412 when the first UE 412 and the other UE 414 are transmitting on one or more overlapping resources.

To mitigate interference, the second base station 404 may instruct the other UE 414 to yield to the first UE 412. In an aspect, the second base station 404 may instruct the other UE 414 to reduce a transmission power. In an aspect, the second base station 404 may be configured to mute the other UE 414. For example, the second base station 404 may refrain from granting the other UE 414 uplink resources and/or instruct the other UE 414 to suspend communication. The first base station 402 may be configured to perform similar operations to prevent second-priority traffic of the second cell 406 from interfering with first-priority traffic in an adjacent cell, e.g., cell 408.

Figure 5:
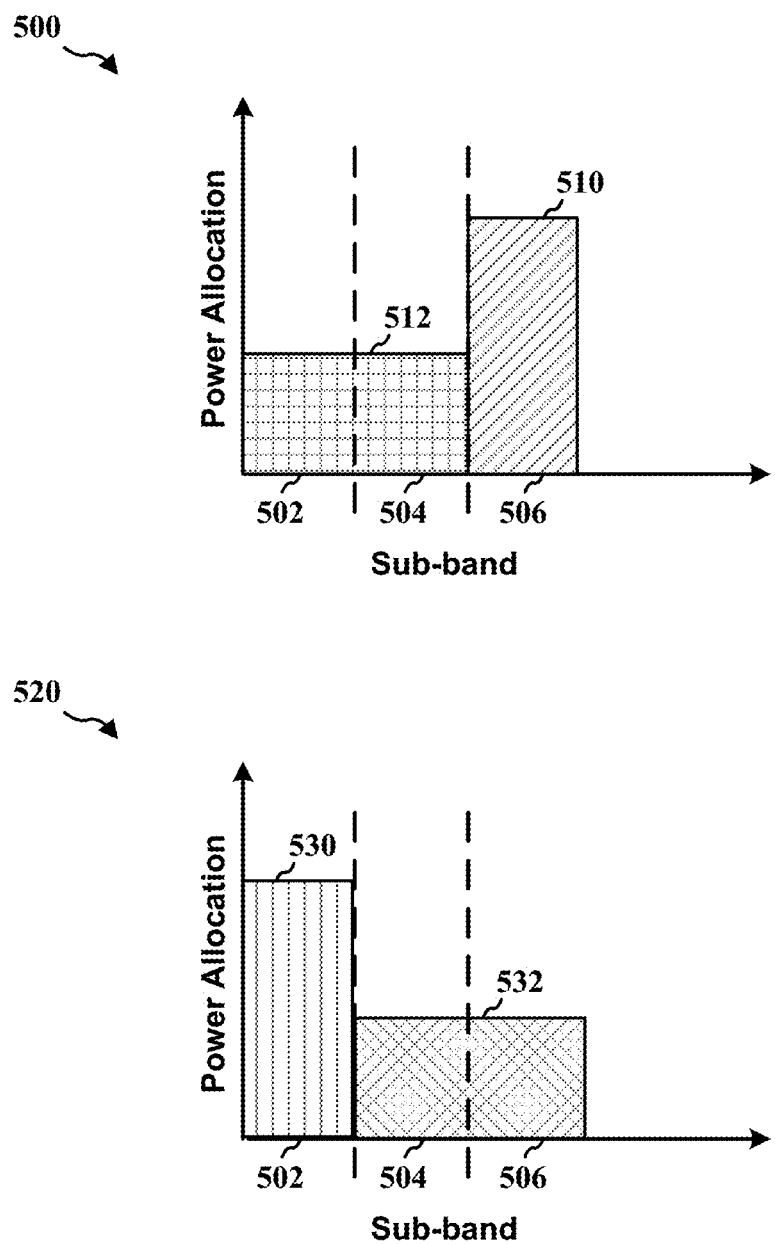
FIG. 5 is a diagram of power allocation across a band.

FIG. 5 illustrates a fractional frequency reuse approach to resource allocation.

The resource allocation scheme discussed in the context of FIG. 5 may be used in OFDMA systems. In an aspect, "faraway" users (e.g., cell-edge users) may be allocated a higher transmit power over a smaller bandwidth, whereas "nearby" users may be allocated a lower transmit power over a larger bandwidth. Therefore, to mitigate inter-cellular interference, the bandwidth over which the higher transmit power allocated to faraway users does not overlap with the bandwidth in an adjacent cell that is allocated to faraway users in the adjacent cell. Thus, bandwidth over which lower transmit power is allocated (e.g., for nearby users) may be reused in every cell.

A first resource allocation 500 for a first cell may include a plurality of sub-bands 502, 504. The transmit power 512 for this plurality of sub-bands 502, 504 may be low, and may be allocated for nearby UEs (e.g., UEs that are not near a cell-edge). For faraway UEs, a sub-band 506 may be allocated, but with a higher transmit power 510.

A second resource allocation 520 for a second cell may include a resource allocation scheme in which a higher transmit power 530 is allocated over the sub-band 502. In the first cell, the allocation 500 features a lower transmit power 512 for the sub-band 502, whereas the allocation 520 features a higher transmit power 530 for the sub-band 502. The allocation of different transmit powers 512, 530, respectively, in the sub-band 502 may reduce interference between traffic in first and second cells.

Figure 6:
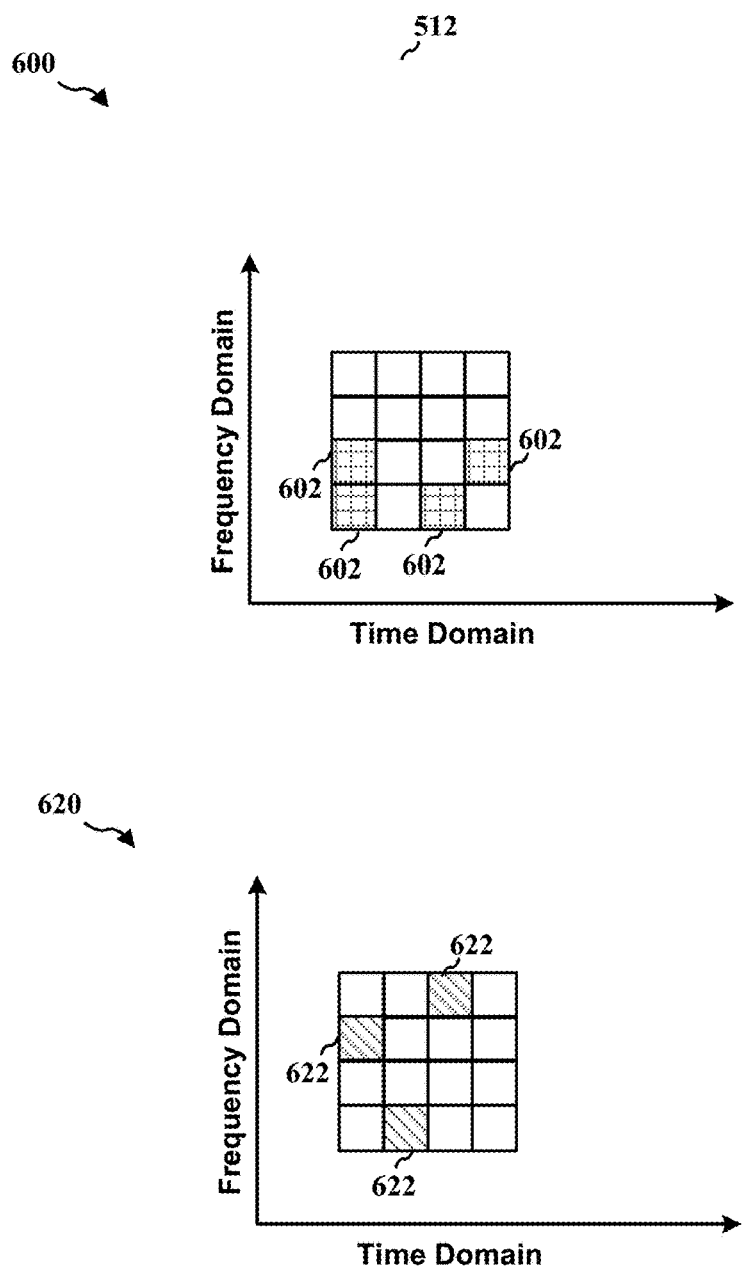
FIG. 6 is a diagram of resource blocks.

In FIG. 6 illustrates an inter-cell interference coordination (ICIC) approach to resource allocation. For ICIC, allocation of time frequency resources in a first cell may avoid high-power transmission on time frequency resources on which cell-edge users are scheduled in neighboring cells. For ICIC, a first base station providing the first allocation 600 may coordinate with a second base station providing a second allocation 620. In aspects, the first base station may assign time frequency resources 602 to a cell-edge UE, whereas the second base station may assign time frequency resources 622 to a cell-edge UE.

Figure 7:
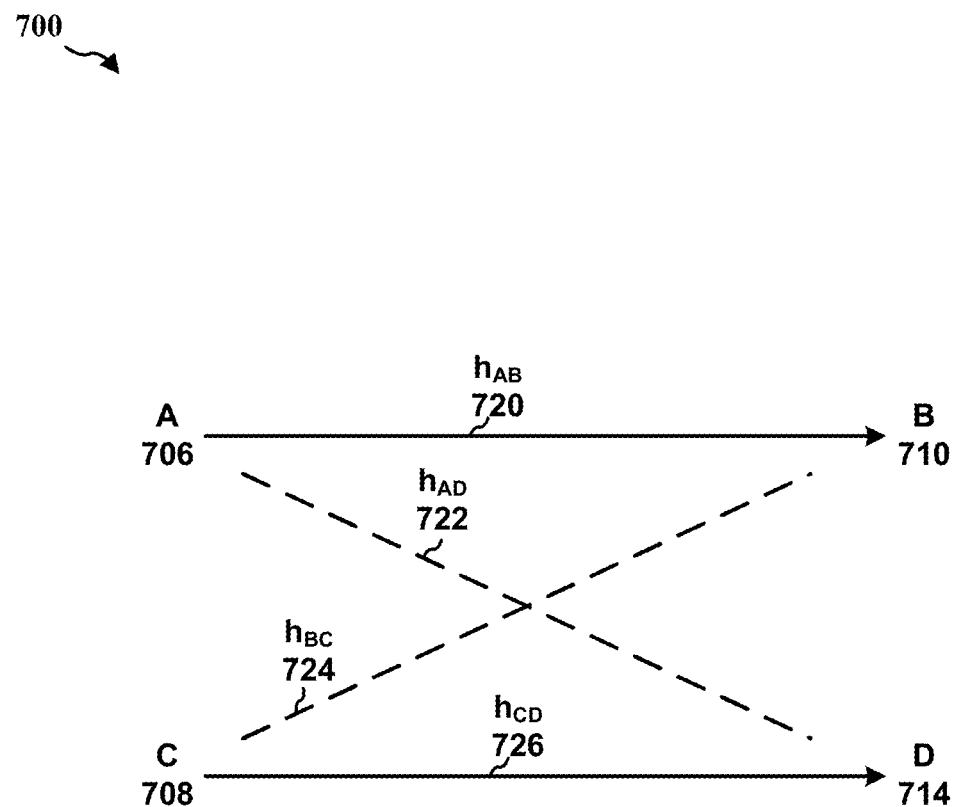
FIG. 7 is a diagram of power allocation.

In FIG. 7, a yielding scheme is illustrated. The yielding scheme 700 may be applicable in FlashLinQ systems. In FlashLinQ, a maximal feasible set of links may be scheduled for any given time slot based on current traffic and/or channel conditions. The feasible set of links may be defined based on link signal-to-interference (SIR) ratios. According to an aspect, links may be selected by assigning priorities to links, and high-priority links may be scheduled but low-priority links may not be scheduled if the low-priority links would cause excessive SIR to a high-priority link. This determination may be performed by comparing an estimated SIR of a high-priority link with a predetermined threshold, wherein the estimation is based on an assumption that the low-priority link proceeds with data transmission. In the context of FIG. 7, a direct power signal 720 may be sent from device A 706 to device B 710. Similarly, a direct power signal 726 may be sent from device C 708 to device D 714. Device B 710 may determine the received power from device A 706 and device D 714 may determine the received power from device C 708. Device B 710 may send the inverse power echo 724 to device C 708. Similarly, device D 714 may send the inverse power echo 722 to device A 706. The inverse power echoes 722, 724 may allow the transmitting devices A 706 and C 708 to estimate the ratios of the received power of their transmissions to that of the receiver's intended transmitter.

FIG. 8 illustrates a time frequency resource allocation scheme for priority-based traffic. In aspects, a first allocation scheme 800 may be provided in a first cell, and a second allocation scheme 820 may be provided in an adjacent cell. In the context of FIG. 4, the first base station 402 may allocate resources according to the allocation scheme 800 and the second base station 404 may allocate resources according to the allocation scheme 820.

In various aspects, traffic may be allocated for transmission time intervals (TTIs). In the time domain, one TTI 802 occurs in both the first and the second cell. Thus, interference may occur between traffic in the first and the second cell during the TTI 802. To mitigate interference, a wideband spectrum may be divided.

In the first allocation scheme 800, frequency resources 806 may be divided. A first set of frequency resources 810 may be allocated for traffic associated with a first priority (e.g., MiCr), and a second set of frequency resources 812 may be allocated for traffic associated with a second priority (e.g., normal traffic). In an aspect, the frequency resources 806 are not evenly divided—e.g., a larger amount of frequency resources 812 may be allocated for second-priority traffic, which may be more voluminous than first-priority traffic.

In the context of FIG. 4, the first base station 402 may allocate a first set of resources, which may be used by the first UE 412 generating first-priority traffic. Similarly, the first base station 402 may allocate a second set of resources, which may be used by the second UE 410 generating second-priority traffic.

In the second allocation scheme 820, the same frequency resources 806 may be divided. However, the frequency resources 806 may be divided differently than in the first allocation scheme 800. According to the allocation scheme 820, a first set of frequency resources 822 may be allocated for traffic associated with a first priority (e.g., MiCr), and a second set of frequency resources 824 may be allocated for traffic associated with a second priority (e.g., normal traffic). In an aspect, the frequency resources 806 are not evenly divided—e.g., a larger amount of frequency resources 824 may be allocated for second-priority traffic, which may be more voluminous than first-priority traffic.

In the context of FIG. 4, the second base station 404 may allocate a first set of resources, which are to be used by the third UE 414 generating second-priority traffic. Similarly, the second base station 404 may allocate a second set of resources, which are to be used by the fourth UE 416 generating first-priority traffic.

Because the first and second base stations share the same set of frequency resources 806 during a TTI 802, the allocation schemes 800, 820 may mitigate interference. Specifically, the first and second base stations may negotiate so that the set of frequency resources 810 assigned to first-priority traffic in the first cell does not overlap with the set of frequency resources 822 assigned to first-priority traffic in the second cell.

In the context of FIG. 4, the first and second base stations 402, 404 may negotiate to allocate frequency resources for first-priority traffic in the first cell 406 and first-priority traffic in the second cell 408.

Figure 9:
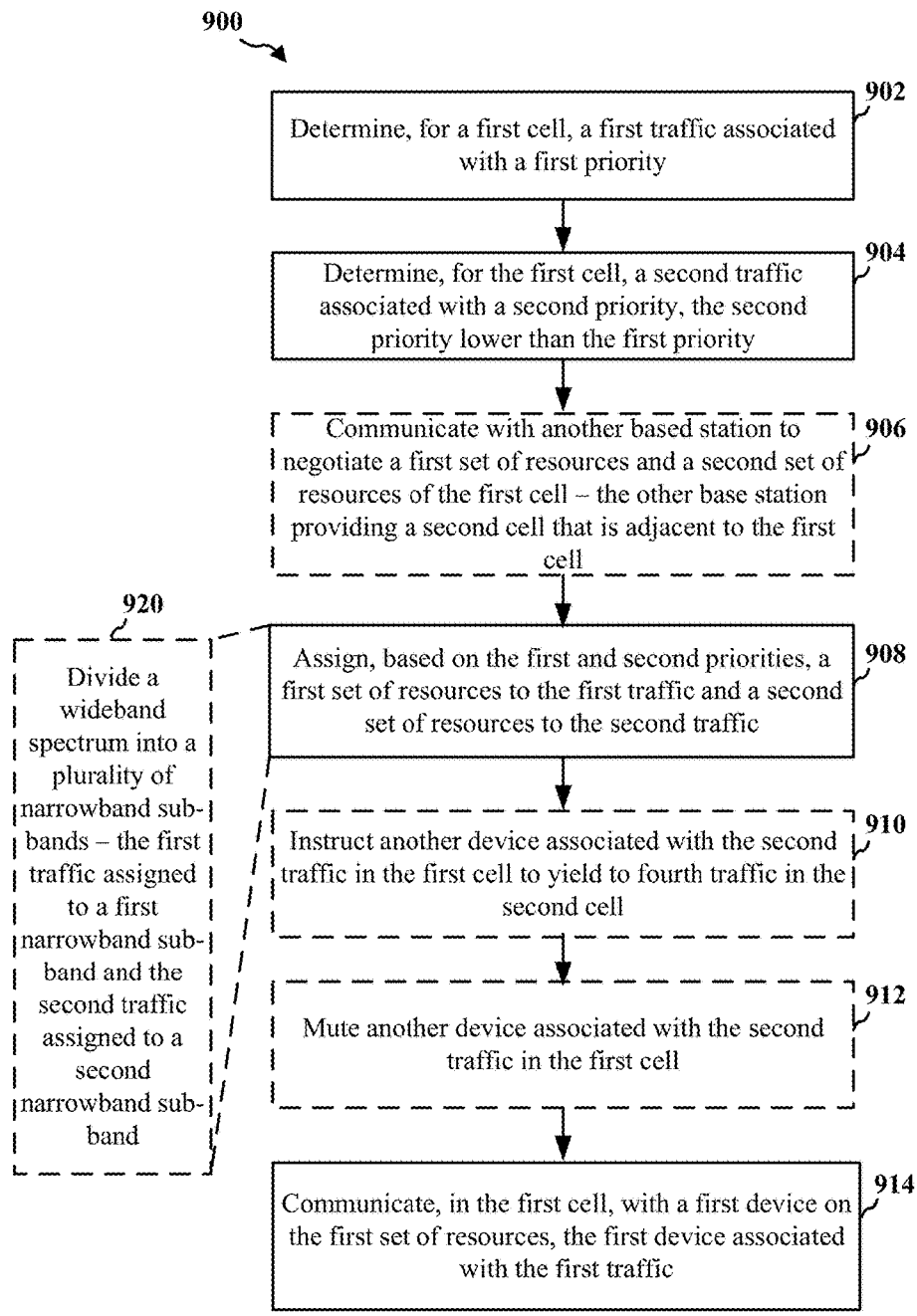
FIG. 9 is a flowchart of a method of wireless communication.

FIG. 9 is a flowchart of a method 900 of wireless communication. The method may be performed by a base station (e.g., the first base station 402, the second base station 404, the apparatus 1002/1002'). Various operations of the method 900 may be optional. Further, one or more operations of the method 900 may be transposed and/or contemporaneously performed.

At operation 902, a base station may determine, for a first cell, first traffic associated with a first priority. For example, the base station may determine that a device operating in a cell provided by the base station is configured to communicate first traffic associated with a first priority. The first traffic may be MiCr traffic, which may be prioritized over other traffic. In the context of FIG. 4, the first base station 402 may be configured to determine first traffic associated with a first priority, such as traffic associated with the first UE 412.

At operation 902, the base station may determine, for the first cell, second traffic associated with a second priority. The second priority may be a lower priority than the first priority. For example, the second traffic may be normal or conventional voice and/or data traffic. In the context of FIG. 4, the first base station may be configured to determine second traffic associated with a second priority, such as traffic associated with the second UE 410.

At operation 906, the base station may communicate with another base station to negotiate a first set of resources and a second set of resources of the first cell. The other base station may provide a cell that is adjacent to the first cell. In the context of FIG. 4, the first base station 402 may communicate with the second base station 404 to negotiate resources for UEs 410, 412 in the first cell 406 and UEs 414, 416 in the second cell 408 based on respective priorities associated with the UEs 410, 412, 414, 416.

At operation 908, the base station may assign, based on the first second priorities, a first set of resources to the first traffic and a second set of resources to the second traffic. For example, the base station may assign a first set of resources to MiCr traffic, and the first set of resources may overlap with a third set of resources assigned to normal traffic in the adjacent cell. In the context of FIG. 4, the first base station 402 may assign a first set of resources to the first UE 412 and a second set of resources to the second UE 410.

In an aspect, operation 908 may include operation 920. At operation 920, the base station may divide a wideband spectrum into a plurality of sub-bands. In an aspect, the base station may assign first-priority traffic to a first sub-band and may assign second traffic to a second sub-band. In the context of FIG. 4, the first base station 402 may divide a wideband spectrum available for communication in the first cell 406 into a plurality of sub-bands. The first base station 402 may then assign a first sub-band to the first UE 412 and a second sub-band to the second UE 410.

At operation 910, the base station may instruct another device associated with second traffic in the first cell to yield to fourth traffic in the second cell. In an aspect, the fourth traffic may be associated with a higher priority than the priority with which the second traffic is associated. For example, the base station may instruct a UE associated with normal-priority traffic in the first cell to yield to another UE associated with MiCr-priority traffic in an adjacent cell. In the context of FIG. 4, the first base station 402 may instruct the second UE 410 to yield to first-priority traffic in the second cell 408. For example, the first base station 402 may indicate to the second UE 410 that the second UE 410 is to decrease transmit power or suspend transmission when the second UE 410 detects communication on the same resources on which the second UE 410 is scheduled.

At operation 912, the base station may mute another device associated with second traffic in the first cell. For example, the base station may mute a UE associated with normal-priority traffic in the first cell (e.g., by not scheduling the UE) so that the UE does not cause interference to MiCr-priority traffic in an adjacent cell. In the context of FIG. 4, the first base station 402 may mute the second UE 410 associated with second-priority traffic in the first cell 406.

At operation 914, the base station may communicate with a first device on the first set of resources. The first device may be associated with the first traffic. In the context of FIG. 4, the first base station 402 may communicate with the first UE 412 on the first set of assigned resources. Similarly, the base station may communicate with another device on the second set of resources. In the context of FIG. 4, the first base station 402 may communicate with the second UE 410 on the second set of assigned resources.

Figure 10:
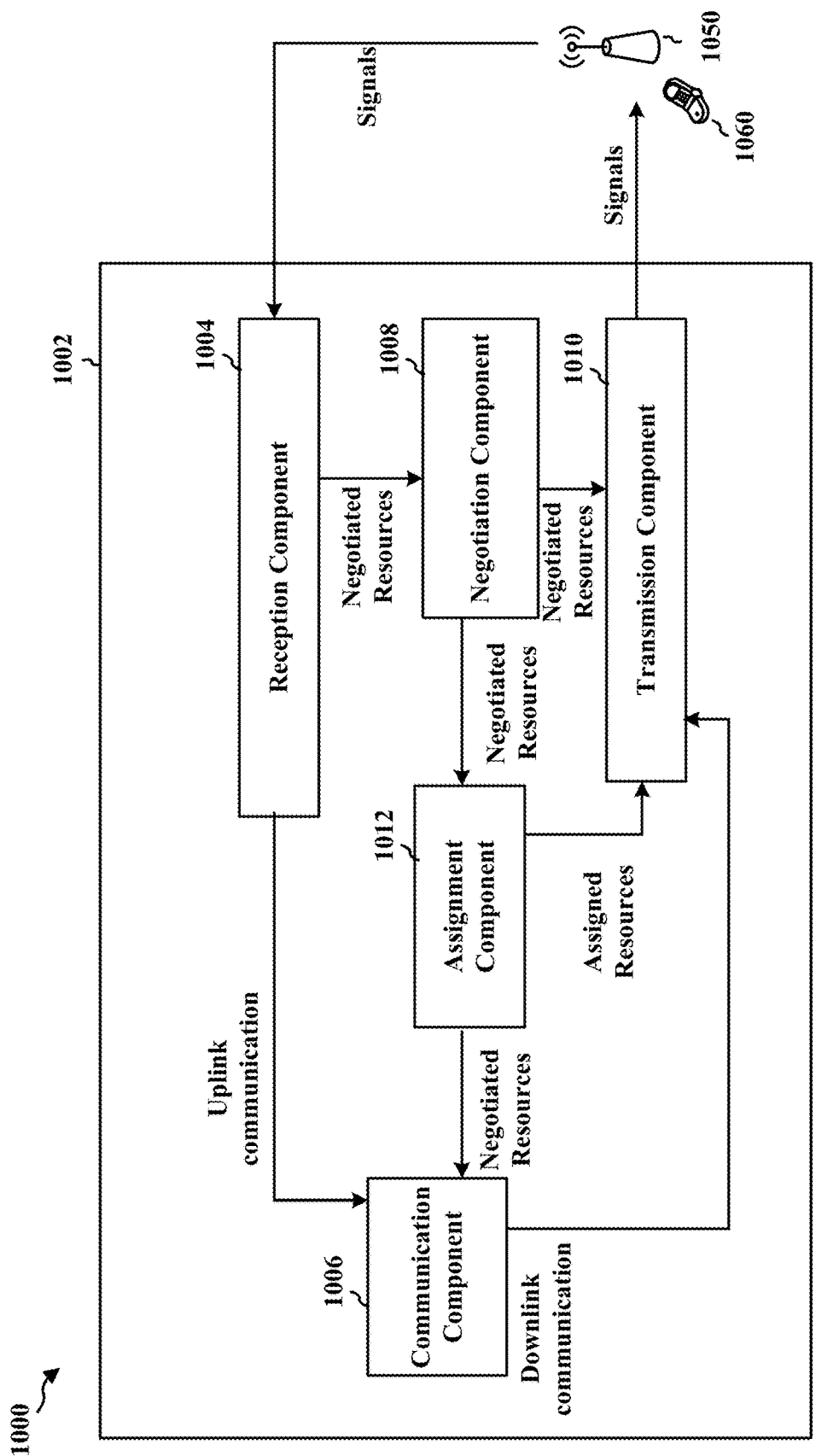
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station, such as the first base station 402. The apparatus may include a reception component 1004 that is configured to receive signals from another base station (e.g., the base station 1050) and/or a UE (e.g., the UE 1060).

The apparatus 1002 may include a communication component 1006. In an aspect, the communication component 1006 may be configured to determine first traffic associated with a first priority. The communication component 1006 may be further configured to determine second traffic associated with a second priority. In an aspect, the first priority may be prioritized over the second priority. In an aspect, the communication component 1006 may be configured to receive signals from one or more UEs 1060 operating in a cell provided by the apparatus 1002 to determine first traffic associated with the first priority and second traffic associated with the second priority.

The apparatus 1002 may include an assignment component 1012. The assignment component 1012 may be configured to assign, based on the first priority and the second priority, a first set of resources to the first traffic and a second set of resources to the second traffic.

The apparatus 1002 may include a negotiation component 1008. In an aspect, the negotiation component 1008 may be configured to communicate with another base station 1050 to negotiate the first set of resources and the second set of resources.

In an aspect, the communication component 1006 may be configured to indicate the assigned resources to a UE 1060 through the transmission component 1010. For example, if the UE 1060 is associated with at least the first priority, then the communication component 1006 may indicate the assigned first set of resources to the UE 1060. In an aspect, the communication component 1006 may be configured to communicate with the UE 1060 on the assigned set of resources. For example, fi the UE 1060 is associated with the first priority, then the communication component 1006 may be configured to communicate with the UE 1060 on the first set of resources.

The apparatus 1002 may include a transmission component 1010 configured to cause transmission to a UE 1060 and/or a base station 1050. As aforementioned, the transmission component 1010 may cause transmission of communication on an assigned set of resources to the UE 1060. Additionally, the transmission component 1010 may be configured to send signals associated with negotiation of resources from the negotiation component 1008.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
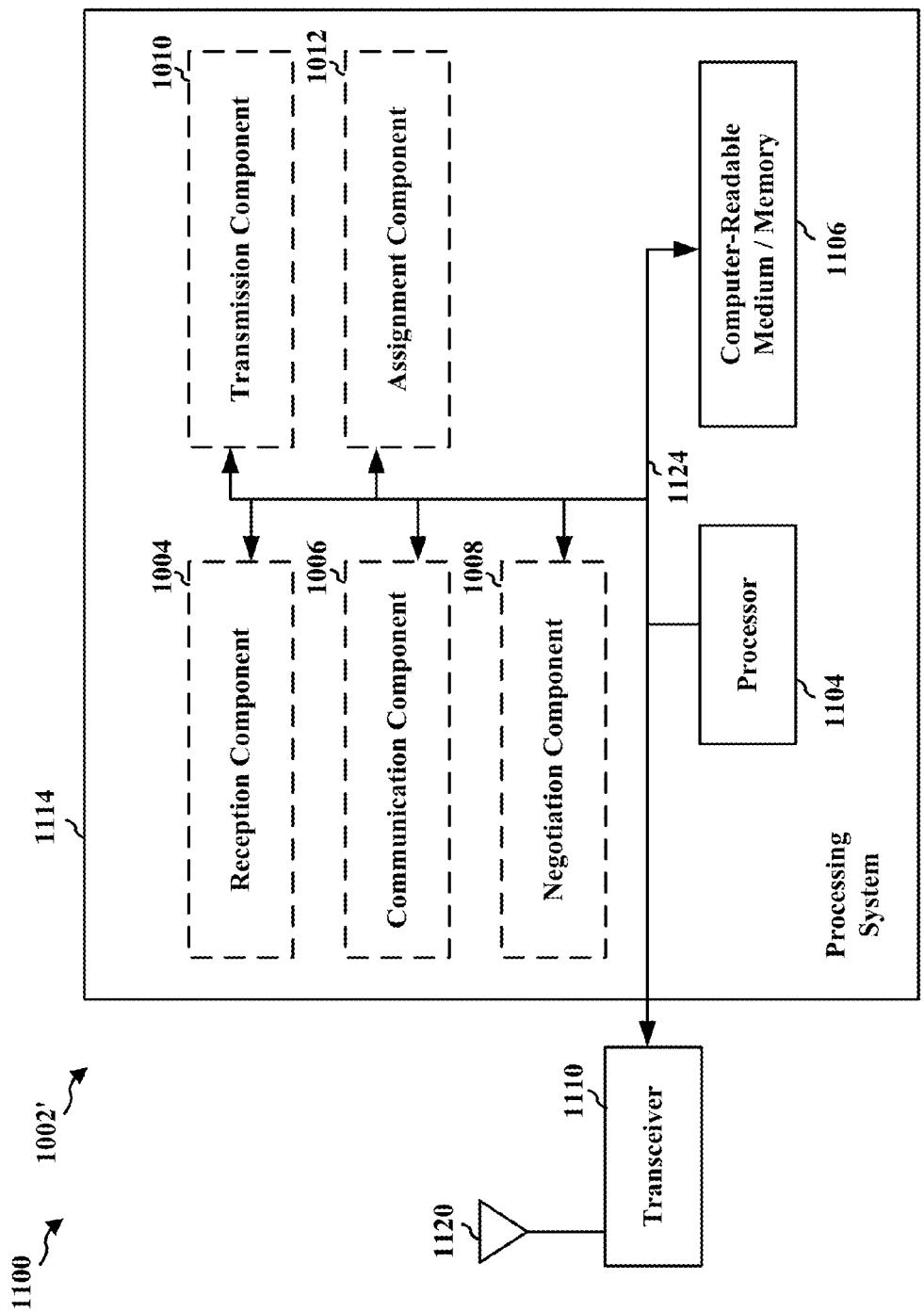
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for <all means limitations>. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, the method comprising:
    determining, for a first cell, a first traffic associated with a first priority;
    determining, for the first cell, a second traffic associated with a second priority, the second priority lower than the first priority;
    dividing a wideband spectrum into a plurality of sub-bands, wherein the first traffic is assigned to a first set of resources on a first sub-band based on the first and second priority, the second traffic is assigned to a second set of resources on a second sub-band based on the first and second priority, and a third traffic is assigned to a third set of resources of a third sub-band of a second cell that does not overlap with the first sub-band and at least partially overlaps with the second sub-band;
    wherein the first set of resources in the first cell and the third set of resources of the second cell do not overlap and the third set of resources are assigned to a third priority of third traffic in the second cell that is relatively higher than the second priority;
    communicating, in the first cell, with a first device on the first set of resources, the first device associated with the first traffic; and
    sending, to a second device associated with the second traffic, an instruction to cause the second device to reduce transmission power of the second device when the second device is transmitting on the second set of resources.

2. The method of wireless communication of claim 1 further comprising,
    communicating with a neighboring base station to negotiate the first set of resources and the second set of resources of the first cell and the third set of resources of the second cell.

3. The method of claim 2, wherein the first set of resources of the first cell and a fourth set of resources of the second cell, include one or more of the same resources, the fourth set of resources assigned to a fourth traffic associated with a fourth priority that is lower than the first priority.

4. The method of claim 2, wherein the second set of resources of the first cell and the third set of resources of the second cell include one or more of the same resources.

5. The method of claim 4, wherein the sending, to the second device associated with the second traffic, the instruction to cause the second device to reduce the transmission power of the second device when the second device is transmitting on the second set of resources comprises:
  instructing the second device associated with the second traffic in the first cell to yield to the third traffic in the second cell.

6. The method of claim 4, wherein the sending, to the second device associated with the second traffic, the instruction to cause the second device to reduce the transmission power of the second device when the second device is transmitting on the second set of resources is based on the third traffic associated with the third priority in the second cell.

7. The method of claim 4, wherein the sending, to the second device associated with the second traffic, the instruction to cause the second device to reduce the transmission power of the second device when the second device is transmitting on the second set of resources comprises:
  muting the second device associated with the second traffic in the first cell.

8. An apparatus for wireless communication, comprising:
  means for determining, for a first cell, a first traffic associated with a first priority;
  means for determining, for the first cell, a second traffic associated with a second priority, the second priority lower than the first priority;
  means for dividing a wideband spectrum into a plurality of sub-bands, wherein the first traffic is assigned to a first set of resources on a first sub-band based on the first and second priority, the second traffic is assigned to a second set of resources on a second sub-band based on the first and second priority, and the third traffic is assigned to a third set of resources on a third sub-band associated with a second cell that does not overlap with the first sub-band and at least partially overlaps with the second sub-band
  wherein the first set of resources in the first cell and the third set of resources of the second cell do not overlap and the third set of resources are assigned to a third priority of third traffic in the second cell that is relatively higher than the second priority;
  means for communicating, in the first cell, with a first device on the first set of resources, the first device associated with the first traffic; and
  means for sending, to a second device associated with the second traffic, an instruction to cause the second device to reduce transmission power of the second device when the second device is transmitting on the second set of resources.

9. The apparatus of wireless communication of claim 8 further comprising,
  means for negotiating the first set of resources and the second set of resources of the first cell and the third set of resources of the second cell, with a neighboring base station.

10. The apparatus of claim 9, wherein the first set of resources of the first cell and a fourth set of resources of the second cell, include one or more of the same resources, the fourth set of resources assigned to a fourth traffic associated with a fourth priority that is lower than the first priority.

11. The apparatus of claim 9, wherein the second set of resources of the first cell and the third set of resources of the second cell include one or more of the same resources.

12. The apparatus of claim 11, wherein the means for sending, to the second device associated with the second traffic, an instruction to cause the second device to reduce transmission power of the second device when the second device is transmitting on the second set of resources is configured to instruct the second device associated with the second traffic in the first cell to yield to the third traffic in the second cell.

13. The apparatus of claim 11, wherein the means for sending, to the second device associated with the second traffic, an instruction to cause the second device to reduce transmission power of the second device when the second device is transmitting on the second set of resources is configured to instruct the second device associated with the second traffic in the first cell to reduce the transmission power based on the third traffic associated with the third priority in the second cell.

14. The apparatus of claim 11, wherein the means for sending, to the second device associated with the second traffic, an instruction to cause the second device to reduce transmission power of the second device when the second device is transmitting on the second set of resources is configured to mute the second device associated with the second traffic in the first cell.

15. An apparatus for wireless communication, the apparatus comprising:
  a memory; and
  at least one processor coupled to the memory and configured to:
    determine, for a first cell, a first traffic associated with a first priority;
    determine, for the first cell, a second traffic associated with a second priority, the second priority lower than the first priority;
    divide a wideband spectrum into a plurality of sub-bands, wherein the first traffic is assigned to a first set of resources on a first sub-band based on the first and second priority, the second traffic is assigned to a second set of resource on a second sub-band based on the first and second priority, and a third traffic is assigned to a third set of resources of a third sub-band of a second cell that does not overlap with the first sub-band and at least partially overlaps with the second sub-band;
    assign, based on the first priority and the second priority, a first set of resources to the first traffic and a second set of resources to the second traffic, wherein the first set of resources in the first cell and the third set of resources of the second cell do not overlap and the third set of resources are assigned to a third priority of third traffic in the second cell that is relatively higher than the second priority;
    communicate, in the first cell, with a first device on the first set of resources, the first device associated with the first traffic; and
    send, to a second device associated with the second traffic, an instruction to cause the second device to reduce transmission power of the second device when the second device is transmitting on the second set of resources.

16. The apparatus of claim 15, wherein the at least one processor is configured to to negotiate the first set of resources and the second set of resources of the first cell and the third set of resources of the second cell with a neighboring base station.

17. The apparatus of claim 16, wherein the first set of resources of the first cell and a fourth set of resources of the second cell, include one or more of the same resources, the fourth set of resources assigned to a fourth traffic associated with a fourth priority that is lower than the first priority.

18. The apparatus of claim 16, wherein the second set of resources of the first cell and the third set of resources of the second cell include one or more of the same resources.

19. The apparatus of claim 18, wherein to send, to the second device associated with the second traffic, an instruction to cause the second device to reduce transmission power of the second device when the second device is transmitting on the second set of resources comprises to instruct the second device associated with the second traffic in the first cell to yield to the third traffic in the second cell.

20. The apparatus of claim 18, wherein to send, to the second device associated with the second traffic, an instruction to cause the second device to reduce transmission power of the second device when the second device is transmitting on the second set of resources comprises to instruct the second device associated with the second traffic in the first cell to reduce the transmission power based on the third traffic associated with the third priority in the second cell.

21. The apparatus of claim 18, wherein to send, to the second device associated with the second traffic, an instruction to cause the second device to reduce transmission power of the second device when the second device is transmitting on the second set of resources comprises to mute the second device associated with the second traffic in the first cell.

22. A non-transitory, computer-readable medium storing computer-executable code for wireless communication, comprising code to:
  determine, for a first cell, a first traffic associated with a first priority;
  determine, for the first cell, a second traffic associated with a second priority, the second priority lower than the first priority;
  divide a wideband spectrum into a plurality of sub-bands, wherein the first traffic is assigned to a first set of resources on a first sub-band based on the first and second priority, the second traffic is assigned to a second set of resource on a second sub-band based on the first and second priority, and a third traffic is assigned to a third set of resources of a third sub-band of a second cell that does not overlap with the first sub-band and at least partially overlaps with the second sub-band;
  assign, based on the first priority and the second priority, a first set of resources to the first traffic and a second set of resources to the second traffic, wherein the first set of resources in the first cell and the third set of resources of the second cell do not overlap and the third set of resources are assigned to a third priority of third traffic in the second cell that is relatively higher than the second priority;
  communicate, in the first cell, with a first device on the first set of resources, the first device associated with the first traffic; and
  send, to a second device associated with the second traffic, an instruction to cause the second device to reduce transmission power of the second device when the second device is transmitting on the second set of resources.

23. The non-transitory, computer-readable medium of claim 22, wherein the code includes code to negotiate the first set of resources and the second set of resources of the first cell and the third set of resources of the second cell with a neighboring base station.

24. The non-transitory, computer-readable medium of claim 23, wherein the first set of resources of the first cell and fourth set of resources of the second cell, include one or more of the same resources, the fourth set of resources assigned to a fourth traffic associated with a fourth priority that is lower than the first priority.

25. The non-transitory, computer-readable medium of claim 23, wherein the second set of resources of the first cell and the third set of resources of the second cell include one or more of the same resources.

26. The non-transitory, computer-readable medium of claim 23, wherein to send, to the second device associated with the second traffic, an instruction to cause the second device to reduce transmission power of the second device when the second device is transmitting on the second set of resources comprises to instruct the second device associated with the second traffic in the first cell to yield to the third traffic in the second cell.

27. The non-transitory, computer-readable medium of claim 23, wherein to send, to the second device associated with the second traffic, an instruction to cause the second device to reduce transmission power of the second device when the second device is transmitting on the second set of resources comprises to instruct the second device associated with the second traffic in the first cell to reduce the transmission power based on the third traffic associated with the third priority in the second cell.

28. The non-transitory, computer-readable medium of claim 23, wherein to send, to the second device associated with the second traffic, an instruction to cause the second device to reduce transmission power of the second device when the second device is transmitting on the second set of resources comprises to mute the second device associated with the second traffic in the first cell.

* * * * *